US012687230B2

(12) United States Patent
Chavan et al.

(10) Patent No.: US 12,687,230 B2
(45) Date of Patent: *\*Jul. 21, 2026*

(54) SEAL ARRANGEMENT FOR A FLUID VALVE, FLUID VALVE AND VEHICLE

(71) Applicant: Vitesco Technologies GmbH, Regensburg (DE)

(72) Inventors: Prashant Chavan, Munich (DE); Dmytro Rozputniak, Munich (DE); Maik Delpho, Munich (DE)

(73) Assignee: Vitesco Technologies GmbH, Regensburg (DE)

( * ) Notice: Subject to any disclaimer, the term of this patent is extended or adjusted under 35 U.S.C. 154(b) by 24 days.

This patent is subject to a terminal disclaimer.

(21) Appl. No.: 18/438,994

(22) Filed: Feb. 12, 2024

(65) Prior Publication Data

US 2024/0183448 A1 Jun. 6, 2024

Related U.S. Application Data

(63) Continuation of application No. 17/638,531, filed as application No. PCT/EP2020/070550 on Jul. 21, 2020, now Pat. No. 12,007,031.

(30) Foreign Application Priority Data

Aug. 30, 2019 (DE) ..................... 10 2019 213 134.4

(51) Int. Cl.
| F16J 15/34 | (2006.01) |
| F16J 15/3224 | (2016.01) |
| F16K 11/085 | (2006.01) |

(52) U.S. Cl.
CPC ......... *F16J 15/344* (2013.01); *F16J 15/3224* (2013.01); *F16K 11/0853* (2013.01)

(58) Field of Classification Search
CPC ... F16J 15/344; F16J 15/3224; F16K 11/0853
See application file for complete search history.

(56) References Cited

U.S. PATENT DOCUMENTS

| 2,270,651 A | 1/1942 | Doyle |
| 2,875,917 A | 3/1959 | Alkire |
| 3,272,519 A | 9/1966 | Voitik |
| (Continued) | | |

FOREIGN PATENT DOCUMENTS

| CN | 104685275 | 6/2015 |
| CN | 205654907 U | 10/2016 |
| (Continued) | | |

*Primary Examiner* — Vishal A Patel
(74) *Attorney, Agent, or Firm* — COZEN O'CONNOR

(57) ABSTRACT

A seal arrangement for a fluid valve includes: a first seal for sealing abutment against a pivotably adjustable valve body of the fluid valve; a second seal for sealing abutment against a valve housing of the fluid valve; and a separate, elastically deformable intermediate piece arranged between a first wall of the first seal and a second wall of the second seal. The intermediate piece has at least one axial section whose cross section has, in relation to the seal opening, a first, radially outer lateral surface and an opposite, second, radially inner lateral surface, and the radially outer lateral surface is at least sectionally concave, and the radially inner lateral surface is at least sectionally convex.

16 Claims, 6 Drawing Sheets

(56)        References Cited

U.S. PATENT DOCUMENTS

| 3,630,833 | A | | 12/1971 | Canalizo | |
|---|---|---|---|---|---|
| 4,087,099 | A | | 5/1978 | Kurio | |
| 4,217,923 | A | | 8/1980 | Kindersley | |
| 4,467,751 | A | * | 8/1984 | Asaka | F16J 15/48 |
| | | | | | 123/190.17 |
| 6,186,511 | B1 | | 2/2001 | Anderson | |
| 7,243,900 | B2 | | 7/2007 | Wang | |
| 8,424,841 | B2 | | 4/2013 | Frenzel | |
| 10,024,184 | B2 | * | 7/2018 | Kennedy | F02C 6/12 |
| 10,196,912 | B2 | * | 2/2019 | Davis | F16J 15/0806 |
| 2004/0017045 | A1 | * | 1/2004 | Cross | F16L 25/0018 |
| | | | | | 277/377 |
| 2019/0154161 | A1 | | 5/2019 | Kazama et al. | |

FOREIGN PATENT DOCUMENTS

| CN | 107435745 | 12/2017 |
|---|---|---|
| CN | 108223830 | 6/2018 |
| CN | 111788420 | 10/2020 |
| CN | 113728186 | 11/2021 |
| DE | 20 2017 000 564 | 3/2017 |
| DE | 102016220542 | 4/2018 |
| GB | 1 104 896 | 3/1968 |
| JP | S 54-108931 | 8/1979 |
| WO | WO 2016/030505 | 3/2016 |

* cited by examiner

SEAL ARRANGEMENT FOR A FLUID VALVE, FLUID VALVE AND VEHICLE

CROSS REFERENCE TO RELATED APPLICATIONS

This application is a continuation of U.S. application Ser. No. 17/638,531 filed Feb. 25, 2022, which is a U.S. national stage of International application No. PCT/EP2020/070550, filed on Jul. 21, 2020, which claims priority to German Application No. 10 2019 213 134.4, filed Aug. 30, 2019, the content of each of which is incorporated herein by reference.

BACKGROUND OF THE INVENTION

1. Field of the Invention

The present invention relates to a seal arrangement, to a fluid valve having such a seal arrangement, and to a vehicle having such a fluid valve.

2. Description of the Prior Art

Such a fluid valve is to be understood here as meaning in particular a cooling-water valve—also referred to as cooling-water control or cooling-water regulating valve—for use in a vehicle.

A vehicle is to be understood here as meaning any type of vehicle which has to be supplied with a liquid and/or gaseous fuel for operation, but in particular passenger motor vehicles and/or utility vehicles. Furthermore, the vehicle may also be a partially electric or fully electric vehicle.

Seals as such can have different roles. They can, for example, serve to prevent or at least to limit undesired fluid losses. A fluid can be understood here as meaning a liquid and/or gaseous medium.

SUMMARY OF THE INVENTION

An object of one aspect of the present invention is to improve sealing between a valve housing and an adjustable, in particular rotatable or pivotable, valve body.

The intention here is for the sealing to remain leak-tight over the long term, specifically under known large temperature variations of a combustion engine periphery and/or an electric motor periphery.

A seal arrangement for a fluid valve is proposed, the seal arrangement comprising:

a first, separate seal for sealing abutment against a pivotably adjustable valve body of the fluid valve, a second, separate seal for sealing abutment against a valve housing of the fluid valve, and a separate, elastically deformable intermediate piece, which is arranged, in an axial direction of the seal arrangement, between a first wall of the first seal and a second wall of the second seal for elastically spacing apart the two seals, wherein the second wall is situated opposite the first wall.

Here, on the first wall, there is furthermore integrally formed a projection arrangement, against which the intermediate piece can be brought into abutment under a load, wherein the projection arrangement is arranged inside the intermediate piece in relation to a seal opening, such that the intermediate piece sealingly encloses the projection arrangement.

Here, the intermediate piece has at least one axial section whose cross section has, in relation to the seal opening, a first, radially outer lateral surface and an opposite, second, radially inner lateral surface. Here, the radially outer lateral surface is at least sectionally concave, and here, the radially inner lateral surface is at least sectionally convex.

The terms concave and convex are to be understood here in the manner conventional for optical lenses.

The proposed shape of the intermediate piece provides the seal arrangement with an advantageous force-displacement characteristic curve in the sense of a system characteristic. Such an advantageous force-displacement characteristic curve is to be understood as meaning a force-displacement characteristic curve in the case of which a force applied to the intermediate piece increases only as little as possible and within certain limits with increasing deformation displacement of the intermediate piece, wherein the increase may be of progressive, linear and/or degressive form.

The proposed shape furthermore makes possible a controlled deformation of the intermediate piece, which as such acts in a tolerance-compensating manner over a wide length tolerance range. During the controlled deformation, along with elastic, axial compression of the intermediate piece, there is additionally realized elastic bending of the axial section, or of a region around a cross-sectional center, of the intermediate piece by way of the concave lateral surface and convex lateral surface. Depending on the degree of the concavity and convexity of the respective lateral surface, the cross section of the intermediate piece describes at least substantially a pressure-activatable V-shape which, as such, increases its sealing action with increasing deformation. As a result of the favorable force-displacement characteristic curve (system characteristic) that is realized, the friction in the fluid valve, and thus also the electrical energy consumption for adjusting the rotatable or pivotable valve body, also referred to as rotary or pivoting piston, is kept to a minimum.

According to one aspect of the present invention, the convex, radially inner lateral surface may have a greater curvature than the concave, radially outer lateral surface. This means that the convexity may be more pronounced than the concavity.

According to a further aspect of the present invention, on both sides of a cross-sectional center of the intermediate piece and at the inner side in a running-around manner in relation to the seal opening, there may be formed in each case a planar lateral surface section.

According to a further embodiment of the present invention, the projection arrangement may be formed as a projection which runs around in a closed manner. As an alternative to this, the projection arrangement could also be in the form of an arrangement of individual claw-like projections, or claws, which run around sectionally and are spaced apart from one another.

The first and second seals and/or the intermediate piece may in each case be/may be of ring-shaped or circular ring-shaped form.

The first seal and/or the second seal may be formed as a hard seal and/or have at least one thermoplastic, in particular PTFE. It may in particular consist thereof, in particular by primary forming.

In addition or as an alternative to this, the first seal and/or the second seal comprises at least one elastomer in one embodiment, and EPDM in one refinement. In one embodiment, it may consist thereof, in particular by primary forming.

The intermediate piece may be formed from an elastically deformable plastic, for example an elastomer, etc.

Also proposed is a fluid valve having at least one seal arrangement of the type described above. Here, the fluid valve may be in the form of a multi-way valve.

Also proposed is the use of such a fluid valve as a cooling-water control valve, in particular in a cooling circuit of a vehicle.

Moreover, a vehicle having a fluid valve of the type described above is also proposed.

BRIEF DESCRIPTION OF THE DRAWINGS

The invention will be explained below in detail with reference to illustrations in the Figures. Further advantageous refinements of the invention emerge from the description below of preferred embodiments. In this respect.

DETAILED DESCRIPTION OF THE PRESENTLY PREFERRED EMBODIMENTS

Figure 1:
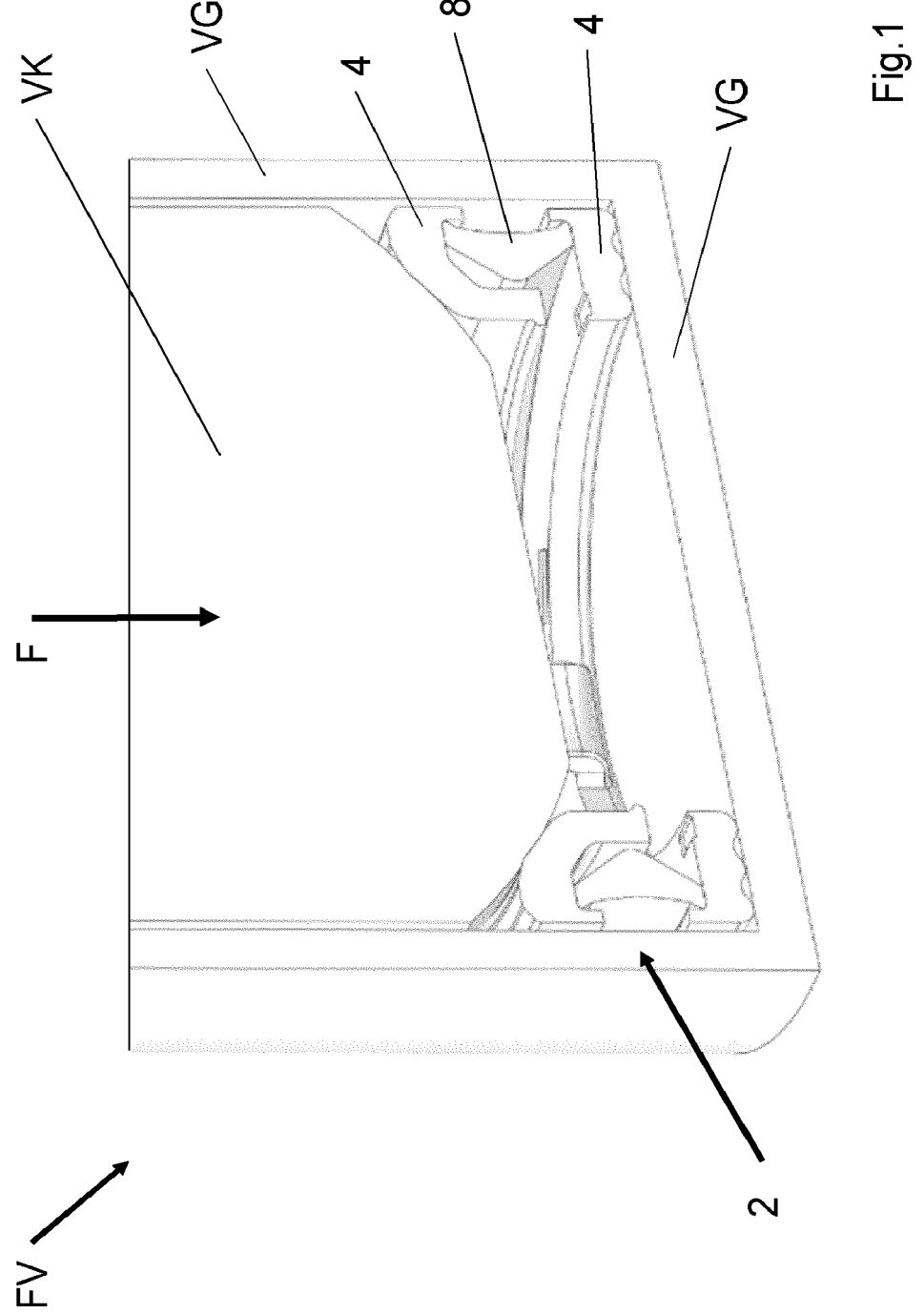
FIG. 1 shows an embodiment of a proposed seal arrangement in an installation position illustrated in perspective view.
Figure 2:
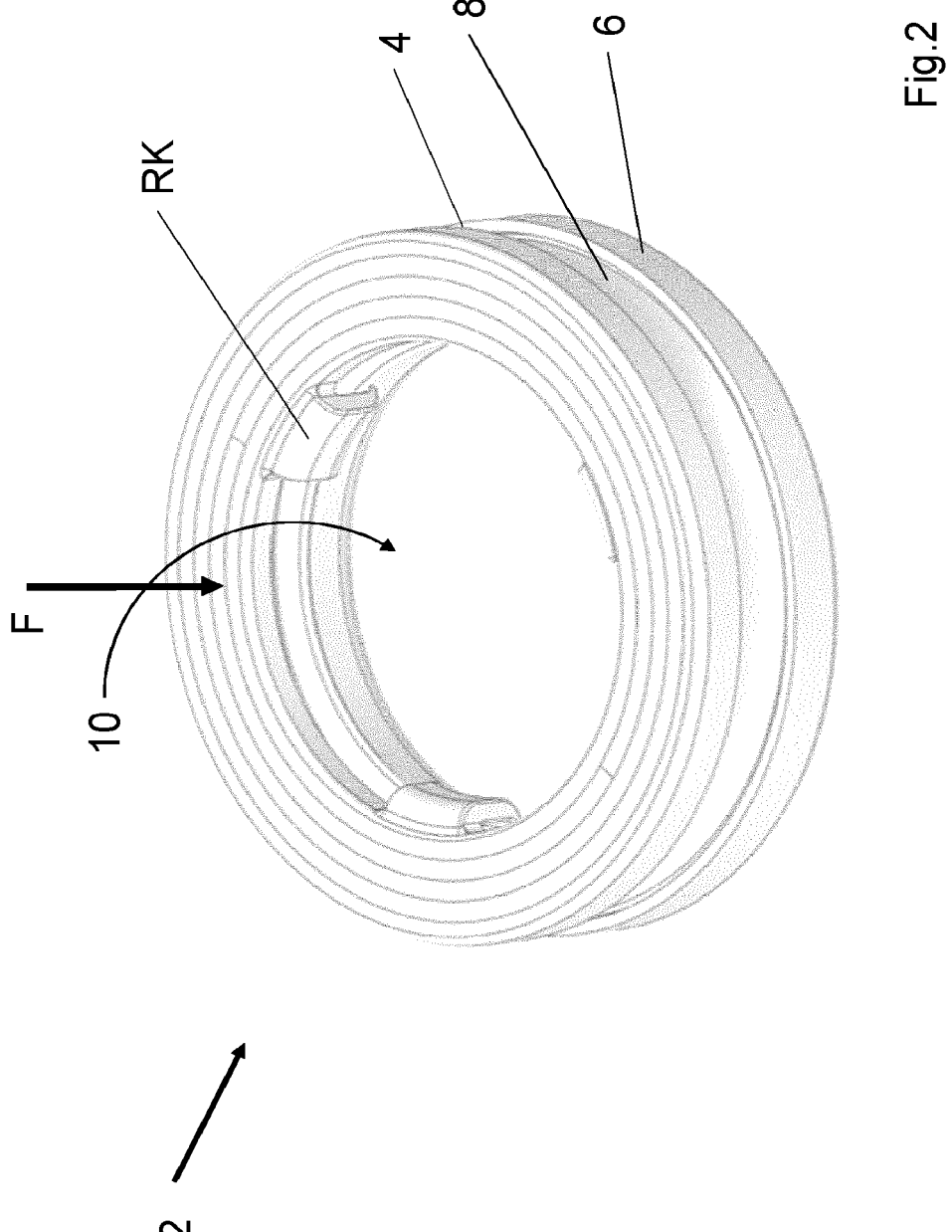
FIG. 2 shows the seal arrangement shown in FIG. 1 in a further perspective view.

The multi-way fluid valve, or multi-way cooling-water control valve, FV—also referred to as multi-way cooling-water regulating valve—that is shown in section in FIG. 1 comprises a seal arrangement 2, or multi-part seal 2, having a first, separate seal 4, having a second, separate seal 6, and having a separate, elastically deformable intermediate piece 8. Here, the first and second seals 4, 6 and the intermediate piece 8 are in each case of circular ring-shaped form, such that they together form a circular ring-shaped seal arrangement 2.

Figure 3:
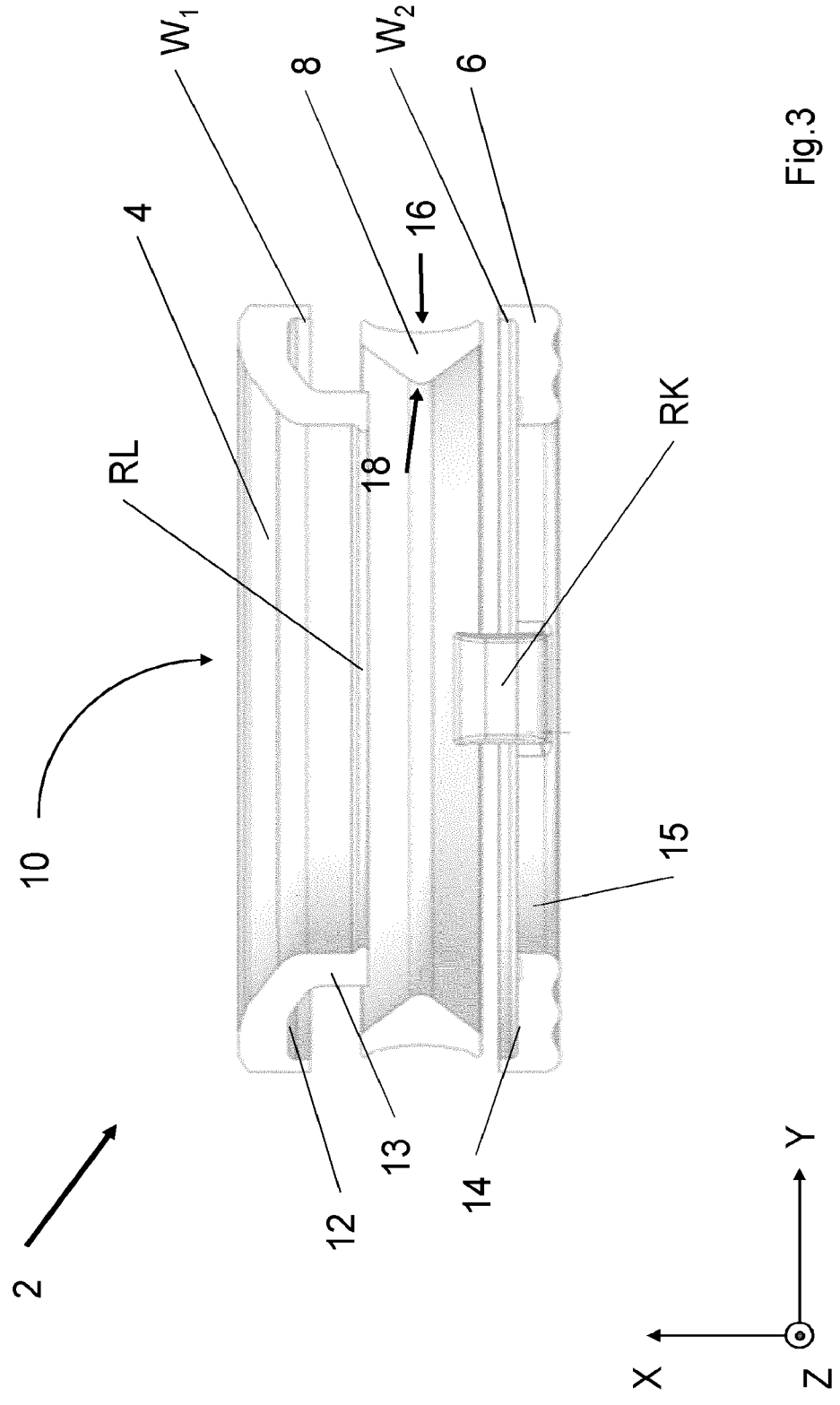
FIG. 3 shows the seal arrangement shown in FIG. 1 and FIG. 2 in an exploded and sectional illustration.

Here, the first seal 4 abuts sealingly against a pivotably or rotatably adjustable valve body VK—also referred to as rotary or pivoting piston—of the fluid valve FV. The second seal 6, by contrast, abuts sealingly against a valve housing VG of the fluid valve FV. Here, the intermediate piece 8 is arranged, in an axial direction X-X of the seal arrangement 2, between a first wall 12 of the first seal 4 and a second wall 14 of the second seal 6 for elastically spacing apart the two seals 4, 6, wherein the second wall 14 is situated opposite the first wall 12 (cf., for example FIG. 3).

Figure 6:
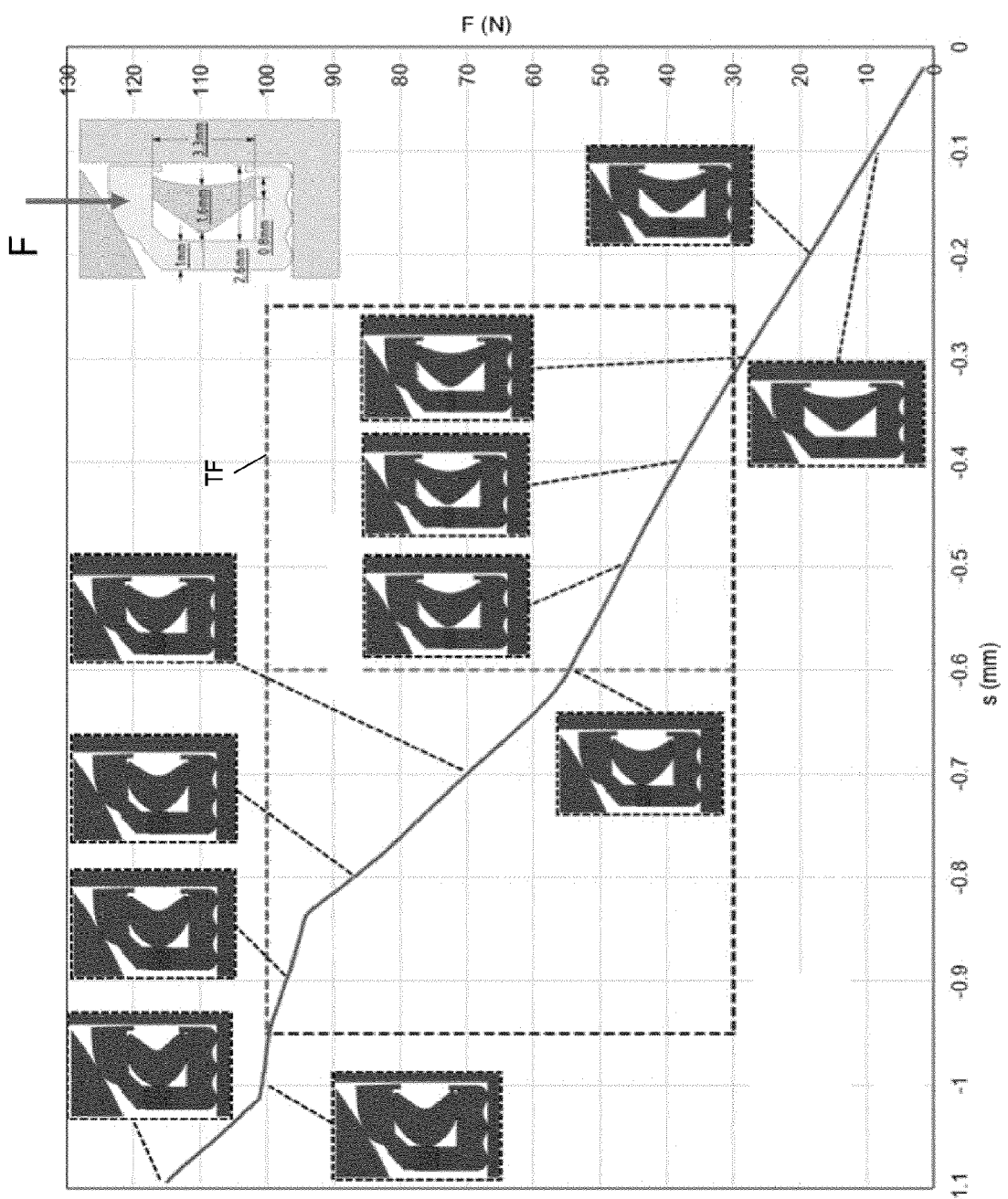
FIG. 6 shows elastic deformations of the intermediate piece shown in FIG. 5 on the extreme right.

On the first seal 4 or on the wall 12 thereof, there is furthermore arranged or integrally formed a projection 13 which runs around in a closed manner and which, as such, is arranged inside the intermediate piece 8 and against which the intermediate piece 8 can be brought into abutment under a load F (cf., FIG. 6).

Here, the intermediate piece 8 has a cross-sectional formation (cf., section line A-A in FIG. 4) that has, in relation to the seal opening 10, a first, radially outer and sectionally concave lateral surface 16 and an opposite, second, radially inner and sectionally convex lateral surface 18.

Figure 5:
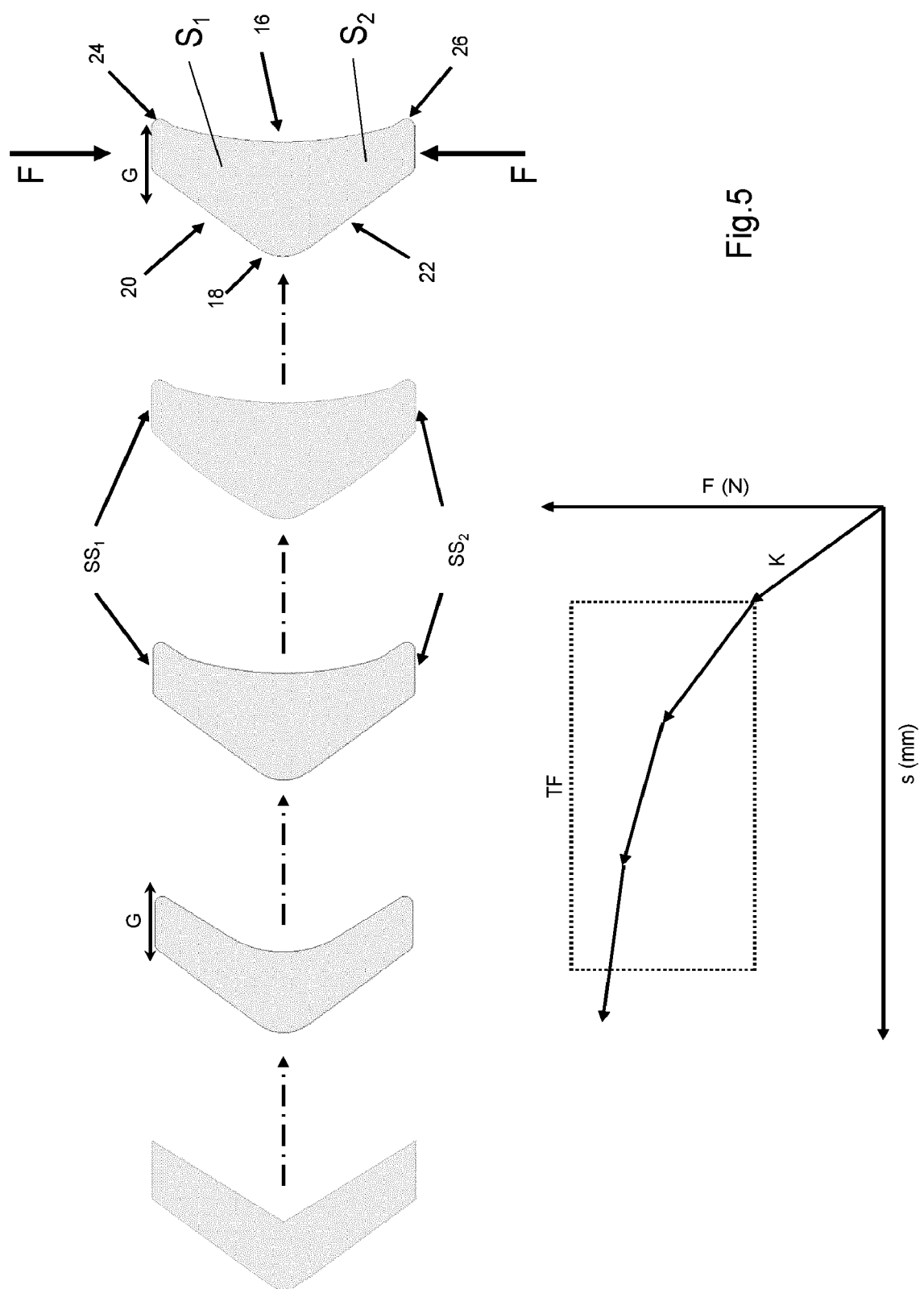
FIG. 5 shows various shapes of a proposed elastically deformable intermediate piece.

Here, the cross-sectional shape of the intermediate piece 8 furthermore describes substantially a V-shape, even though the convex lateral surface 18 ideally has—as can be demonstrated by computational simulations—a greater curvature than the concave lateral surface 16 (cf., for example FIG. 5).

On both sides of a cross-sectional center of the intermediate piece 8 and, in relation to the seal opening 10, at the inner side in a running-around manner, there is formed in each case a planar lateral surface section 20, 22 which is adjoined by the lateral surface 18 and which extends as far as an associated face side $SS_1$, $SS_2$ of the intermediate piece 8 (cf., for example FIG. 5).

The first and second seals 4, 6, or else only one of these, furthermore, is/are in each case formed as a hard seal.

Here, such a hard seal is to be understood as meaning a seal which, by contrast to the intermediate piece 8, is elastically non-deformable, that is to say is rigid, at least at the sealing contact point—whether this has a linear and/or an areal sealing action. Basically, the hard seal may, for example, be manufactured, for example injection-molded, entirely from PTFE (short for polytetrafluoroethylene) and/or the like. As an alternative to this, it would also be possible for the hard seal to be formed from a plastic which has a correspondingly hard coating, for example of PTFE and/or the like, at the sealing side. To save costs, it would also be possible for the second seal 6 to be formed merely from a plastic which is softer and less expensive in comparison with that of the first seal 4.

By contrast, the intermediate piece 8—in the form of a profile running around in a closed manner—is formed from an elastically deformable plastic, for example an elastomer, etc., such that, under an axial load F, the axial spacing of the two seals 4, 6 can, in accordance with a length tolerance situation that is present and is to be compensated, be set by way of a correspondingly elastic deformation of the intermediate piece 8. This elastic deformation moreover gives rise to the desired bracing of the seal arrangement 2 in its installation position (cf., FIG. 1 or FIG. 6).

Two such hard seals 4, 6, as such, for example in the form of two PTFE hard seals, in conjunction with the elastomer intermediate piece 8 already form an arrangement of individual parts which can adhere well to one another, and which can be easily installed as a unit into the fluid valve FV. Moreover, the two PTFE hard seals 4, 6 advantageously prevent misalignment of the elastomer intermediate piece 8 during the installation of the seal arrangement 2.

The proposed seal arrangement 2 is distinguished by the fact that, firstly, it is inexpensive to produce and that, secondly, it acts in a tolerance-compensating manner over a relatively wide length tolerance range, and does so in conjunction with a long-term sealing action. With regard to the fluid valve FV shown in FIG. 1 (cf., FIG. 1), it is possible by means of the seal arrangement 2 to compensate for cumulative length tolerances of up to 1 mm ($\leq 1$ mm) or even beyond this ($\geq 1$ mm).

Figure 4:
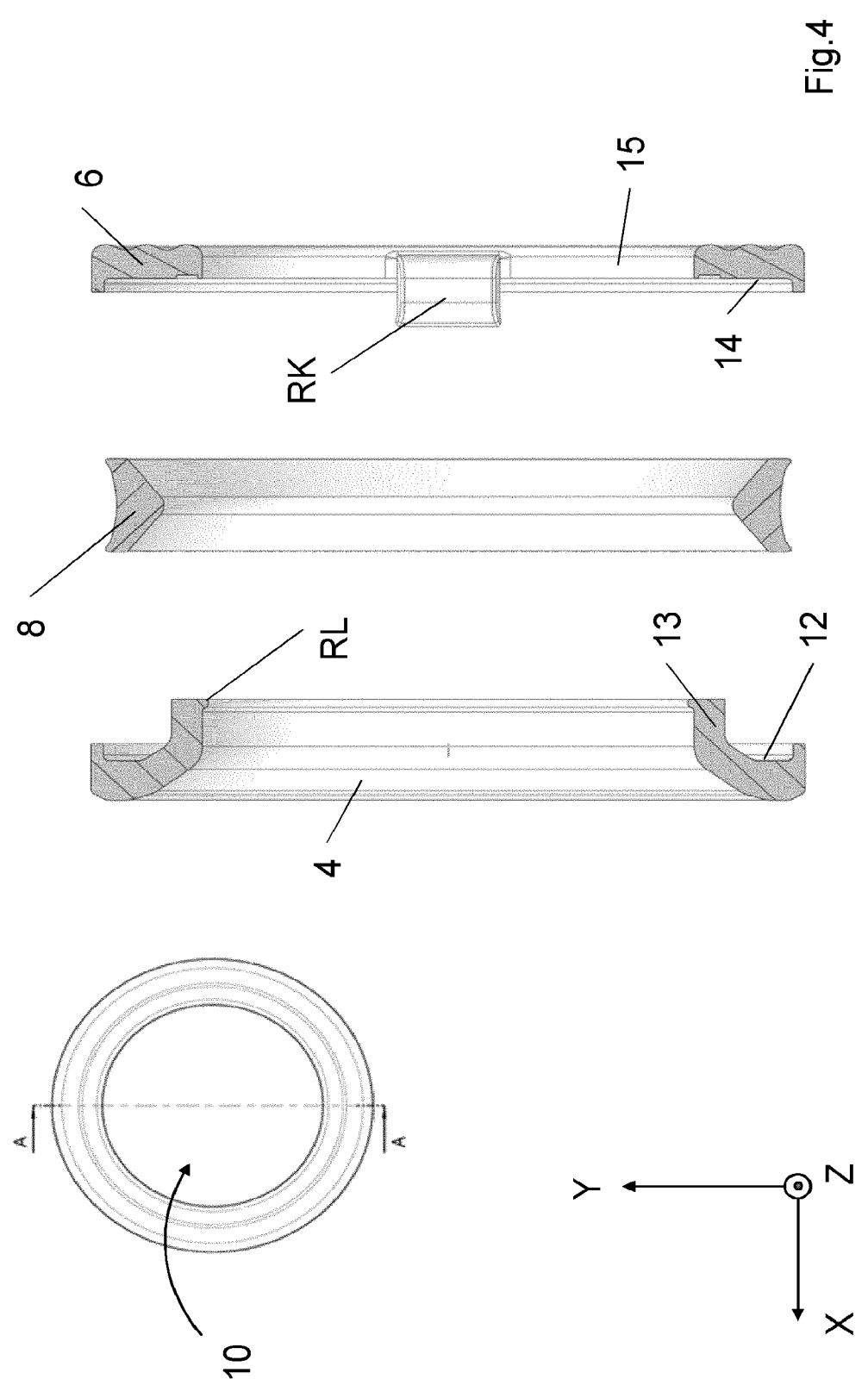
FIG. 4 shows the seal arrangement shown in FIG. 1 and FIG. 2 in a further exploded and sectional illustration.

FIG. 4 illustrates different shapes for the intermediate piece 8, wherein the shape on the extreme left in FIG. 4 corresponds to a virtually ideal V-shape, which as such can be produced, or at least produced only approximately, only in a difficult or cumbersome manner. Proceeding from this ideal V-shape, FIG. 4 describes an iterative approach to the optimized V-shape illustrated on the extreme right. All of these shapes or V-shapes realize under a load F both axial, elastic compression and bending in a region around the cross-sectional center of the intermediate piece 8.

Such a shape or V-shape has a highly favorable stiffness characteristic curve K (cf., FIG. 5). This is to be understood as meaning the force-displacement characteristic curve (F-s characteristic curve) illustrated qualitatively in FIG. 5. Here, the force-displacement characteristic curve (or stiffness characteristic curve K), is situated, in relation to a defined length tolerance range (for example up to 1 mm ($\leq$1 mm)), within the indicated tolerance window TF. Here, FIG. 5 qualitatively illustrates a stiffness characteristic curve K which is degressive within the tolerance window TF.

During the deformation under the load F, the cross section of the intermediate piece 8 is deformed in such a way that the convex lateral surface 18 comes into abutment against the projection (cf., FIG. 6). Here, the face surfaces $SS_1$, $SS_2$ slide along the in each case associated wall 12, 14 transversely to the axial direction X-X of the seal arrangement 2 (cf., FIG. 5 in conjunction with for example FIG. 3; G=sliding). Here, depending on the design of the intermediate piece 8 or of the seal arrangement 2, it is also possible for the two for example convexly shaped end sections 24, 26 of the two limbs $S_1$, $S_2$, or else only one of the end sections 24, 26, to come into abutment against a corresponding wall $W_1$, $W_2$ of an associated projection of the respective seal 4, 6 (cf., FIG. 3 or FIG. 4).

This is also illustrated by FIG. 6, in which individual deformation states of the intermediate piece 8 are illustrated at different points in a force-deformation diagram. It can also be seen here that the stiffness characteristic curve is situated within the indicated tolerance window TF over the entire length tolerance range of approximately $-0.95 \leq s \leq -0.25$ and exits the tolerance window TF for the first time at approximately $-0.95$ mm.

The proposed shape of the intermediate piece 8 provides the seal arrangement 2 with an advantageous force-displacement characteristic curve (cf., FIG. 5 or FIG. 6) in the sense of a system characteristic. Such an advantageous force-displacement characteristic curve is to be understood as meaning a force-displacement characteristic curve in the case of which a force F applied to the intermediate piece 8 increases only as little as possible and within certain limits with increasing deformation displacement s of the intermediate piece, wherein the increase may be of progressive, linear and/or degressive form.

The proposed shape furthermore makes possible a controlled deformation of the intermediate piece 8, which as such acts in a tolerance-compensating manner over a wide length tolerance range. During the controlled deformation, along with elastic, axial compression of the intermediate piece 8, there is additionally realized elastic bending of the cross section—or of a region around the cross-sectional center—of the intermediate piece 8 by way of the concave lateral surface 16 and convex lateral surface 18. Depending on the degree of the concavity and convexity of the respective lateral surface 16, 18, the cross section of the intermediate piece 8 describes at least substantially a pressure-activatable V-shape (cf., FIG. 5).

Although exemplary embodiments have been explained in the above description, it should be pointed out that numerous modifications are possible. It should moreover be pointed out that the exemplary embodiments are merely examples which are not intended to limit the scope of protection, the applications and the structure in any way. Instead, the above description gives a person skilled in the art a guideline for the realization of at least one exemplary embodiment, wherein various changes may be made, in particular with regard to the function and arrangement of the component parts described, without departing from the scope of protection resulting from the claims and combinations of features equivalent thereto.

The invention claimed is:

1. A seal arrangement (2) for a fluid valve (FV), the seal arrangement comprising:

a first seal (4) that sealing abuts against a pivotably adjustable valve body (VK) of the fluid valve (FV) having, at its radial outer edge, a first axially extending wall;

a second seal (6) that sealing abuts against a valve housing (VG) of the fluid valve (FV) having, at its radial outer edge, a second axially extending wall, wherein the first axially extending wall and the second axially extending wall extend toward each other at a same radial position and have respective parallel end faces that directly face each other; and a separate, elastically deformable intermediate piece (8), which is arranged, in an axial direction (X-X) of the seal arrangement (2), between a first wall (12) of the first seal (4) and a second wall (14) of the second seal (6) for elastically spacing apart the first and second seals (4, 6), wherein the second wall (14) is situated opposite the first wall (12), wherein, on the first wall (12), there is integrally formed thereon a projection arrangement (13), against which the intermediate piece (8) can be brought into abutment under a load (F), wherein the projection arrangement (13) is arranged radially inside the intermediate piece (8) in relation to a seal opening (10), such that the intermediate piece (8) sealingly encloses the projection arrangement (13), wherein a radial end face of the projection arrangement (13) directly faces a second wall (14) of the second seal (6), wherein the intermediate piece (8) has at least one axial section whose cross section has, in relation to the seal opening (10), a first, radially outer lateral surface (16) and an opposite, second, radially inner lateral surface (18), and wherein the radially outer lateral surface (16) is at least sectionally concave, and the radially inner lateral surface (18) is at least sectionally convex, wherein a cross section of the intermediate piece (8) is a pressure-activated V-shape having a nonconstant cross section along its axial extent, which, under the load (F), realizes both an axial, elastic compression and a bending in an area around a cross-sectional center of the intermediate piece (8).

2. The fluid valve as claimed in claim 1, wherein a first portion of the radially outer lateral surface (16) is configured to abut a radially inner surface of the first axially extending wall, and wherein a second portion of the radially outer lateral surface (16) is configured to abut a radially inner surface of the second axially extending wall.

3. The fluid valve as claimed in claim 2, wherein the convex, radially inner lateral surface (18) has a greater curvature than the radially outer lateral surface (16) that is a concave.

4. The seal arrangement as claimed in claim 1, wherein the convex, radially inner lateral surface (18) has a greater curvature than the concave, radially outer lateral surface (16).

5. The seal arrangement as claimed in claim 1, wherein, on both sides of a cross-sectional center of the intermediate piece (8) and at an inner side in a running-around manner, there is formed in each case a planar lateral surface section (20, 22).

6. The seal arrangement as claimed in claim 1, wherein the projection arrangement (13) is configured as a projection which runs around in a closed manner.

7. The seal arrangement as claimed in claim 1, wherein the first and second seals (4, 6) and/or the intermediate piece (8) are in each case of a ring-shaped or circular ring-shaped configuration.

8. The seal arrangement as claimed in claim 1, wherein the first seal (4) and/or the second seal (6) are/is configured as a hard seal.

9. The seal arrangement as claimed in claim 1, wherein the intermediate piece (8) is formed from an elastically deformable plastic.

10. A fluid valve having at least one seal arrangement (2) as claimed in claim 1 for sealing off a connection region of the fluid valve.

11. The fluid valve as claimed in claim 10 wherein the fluid valve is a multi-way valve.

12. The fluid valve as claimed in claim 10, configured as a cooling-water control valve.

13. The fluid valve as claimed in claim 12, wherein the cooling-water control valve is configured as a cooling circuit of a vehicle.

14. The seal arrangement as claimed in claim 1, wherein the projection arrangement (13) abuts a radially inner portion of the second wall (14) of the second seal (6).

15. The fluid valve as claimed in claim 1, wherein a radially inner surface contour of the intermediate piece (8) is different than a radially outer surface contour of the intermediate piece (8).

16. The fluid valve as claimed in claim 1, wherein radially outer portions of the intermediate piece (8) rest on the first axially extending wall and the second axially extending wall.

\* \* \* \* \*